G. MOORE.
WEIGHING AND RECORDING MECHANISM.
APPLICATION FILED AUG. 8, 1910.
1,082,967.
Patented Dec. 30, 1913.
5 SHEETS—SHEET 1.
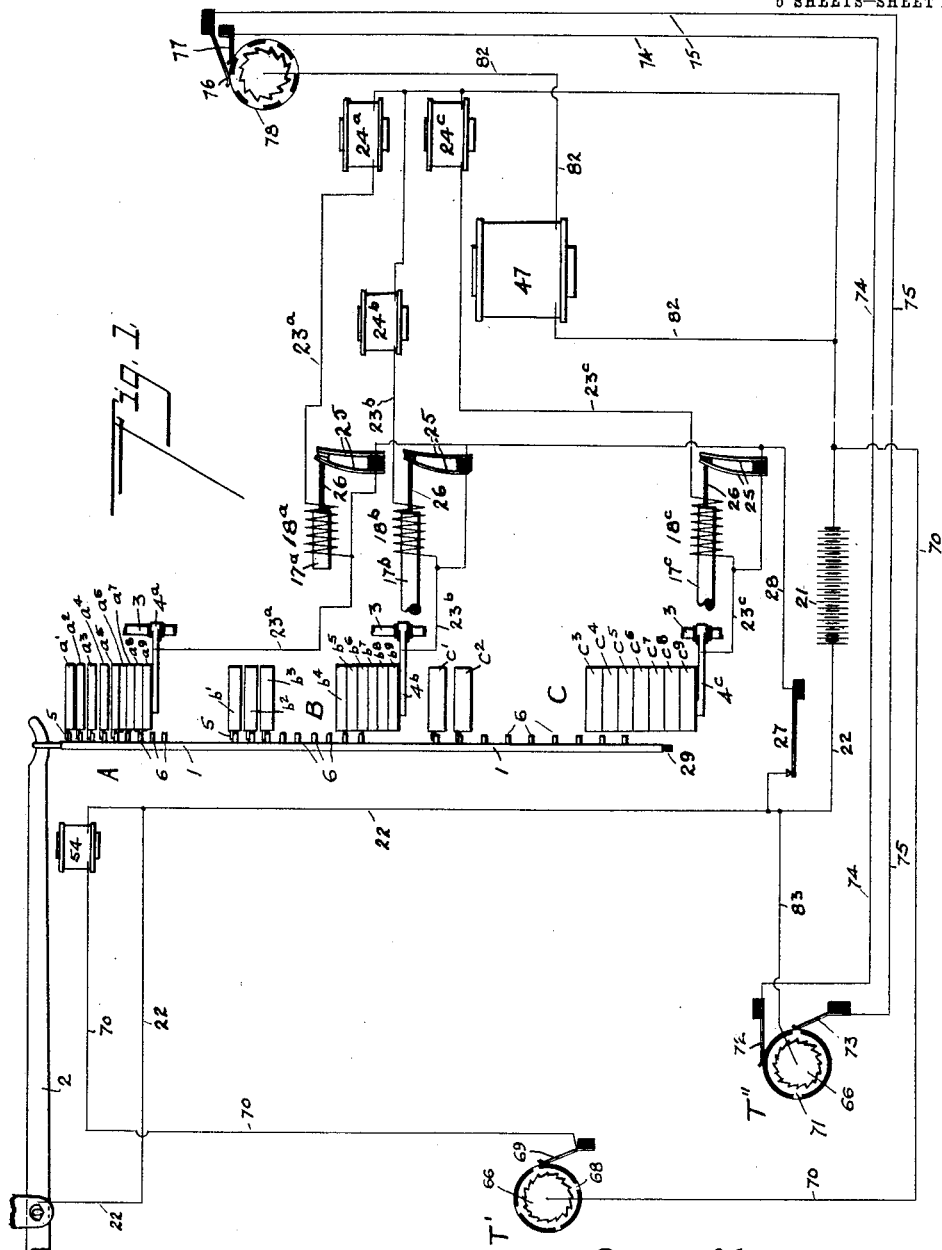
Grayson Moore, Inventor,
Witnesses:
Roy G. Kraf.
Josephine Shaumer
By David O. Barnell,
Attorney.

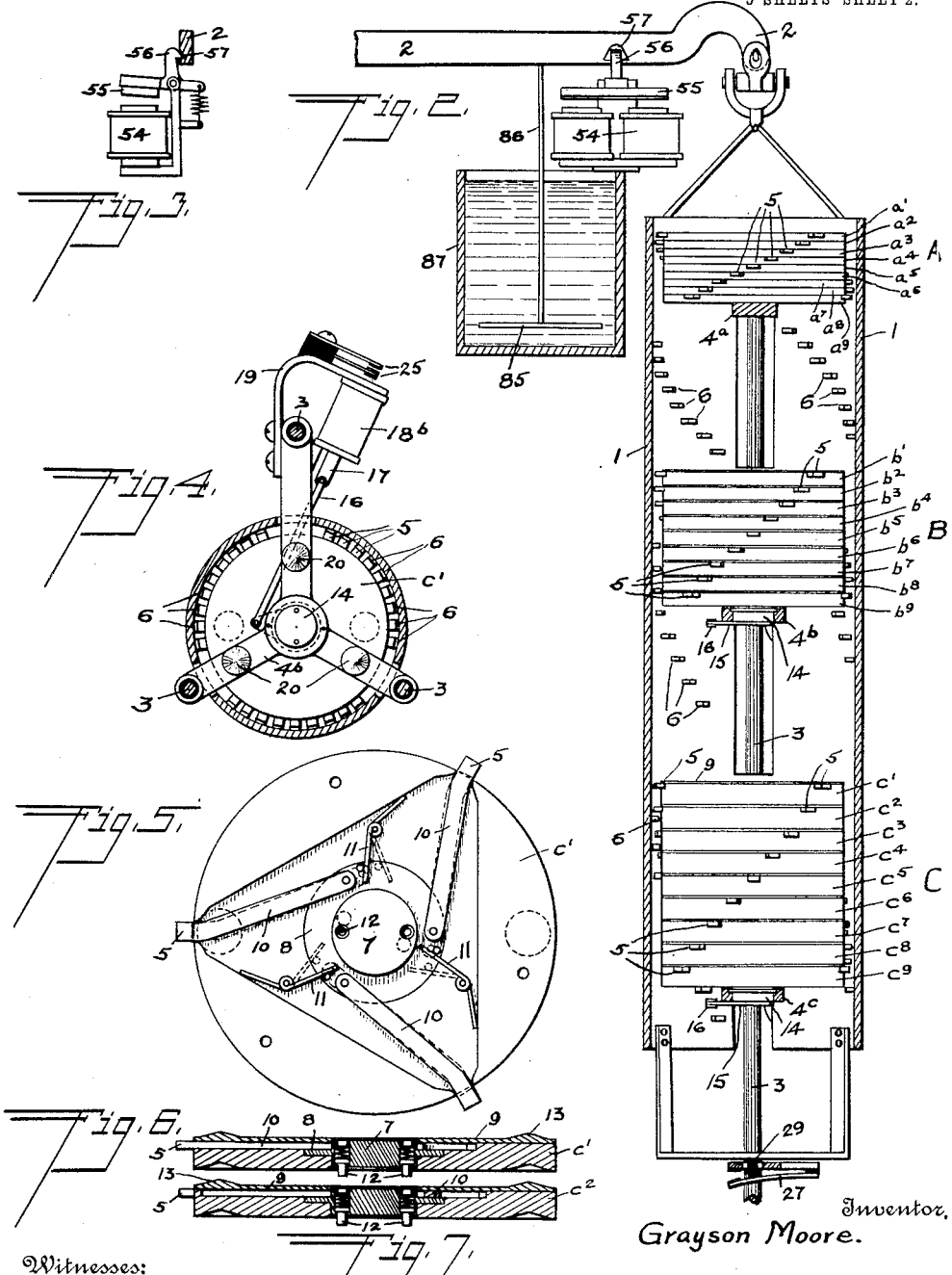

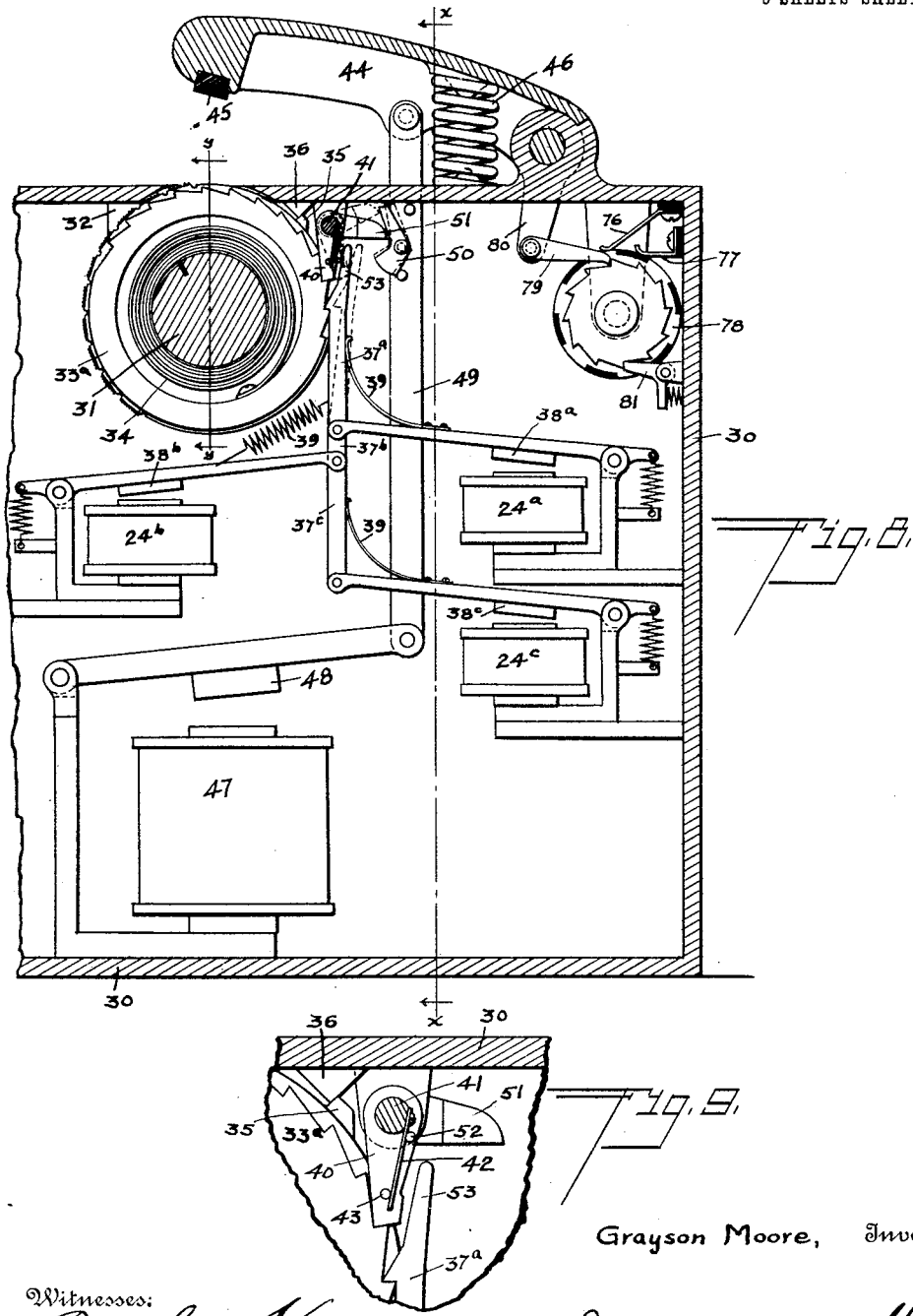

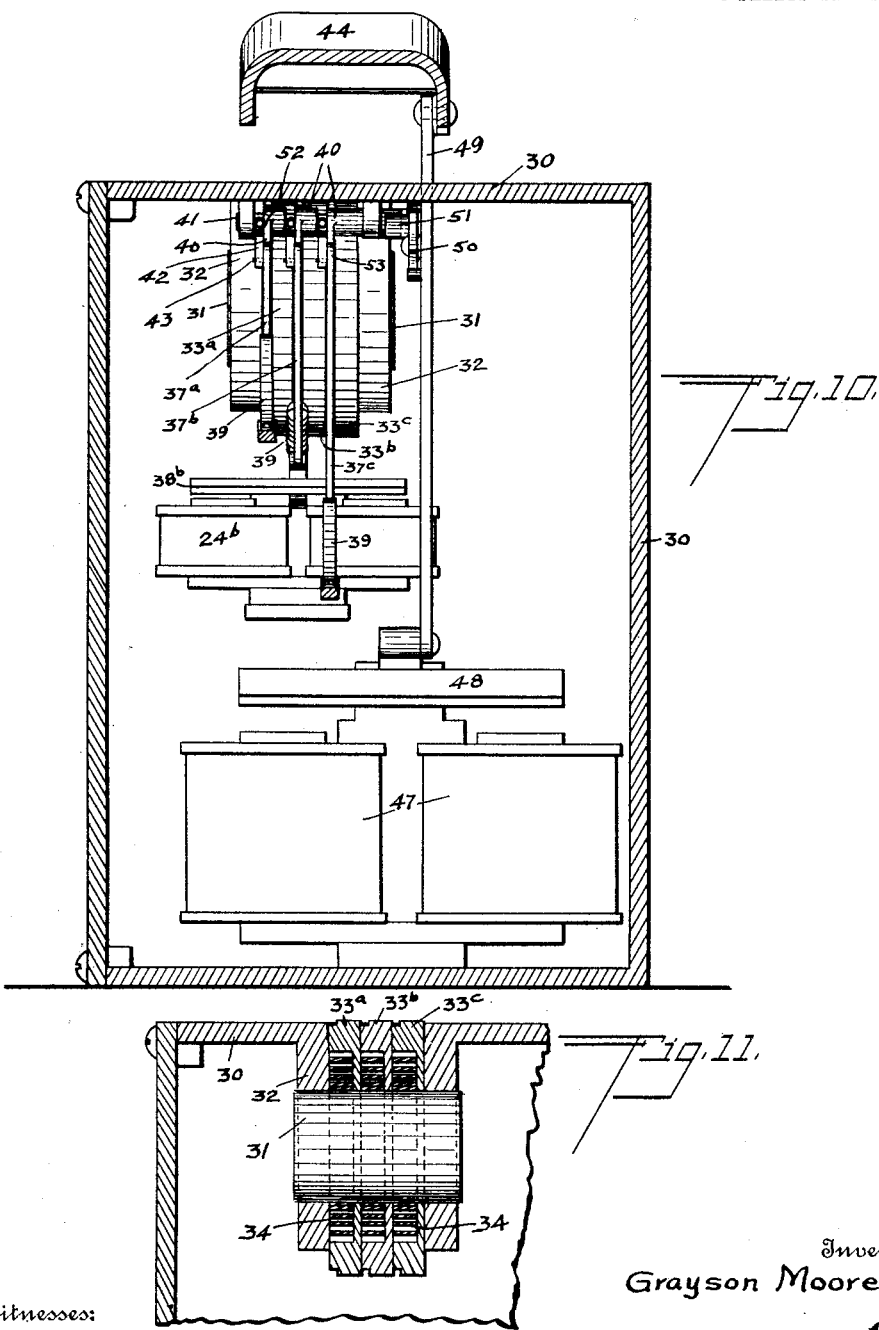

G. MOORE.
WEIGHING AND RECORDING MECHANISM.
APPLICATION FILED AUG. 8, 1910.
1,082,967.
Patented Dec. 30, 1913.
5 SHEETS—SHEET 5.
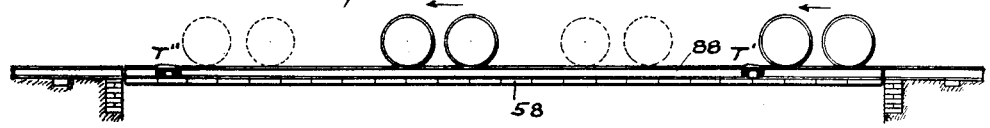
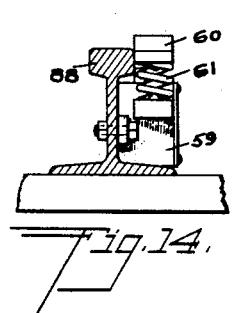
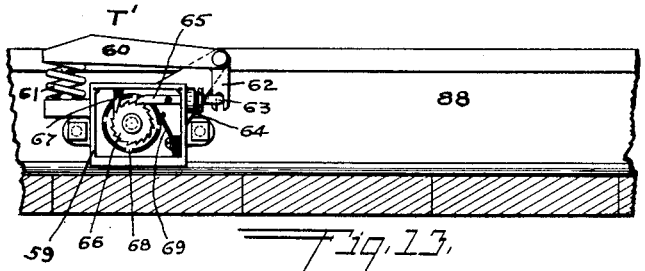
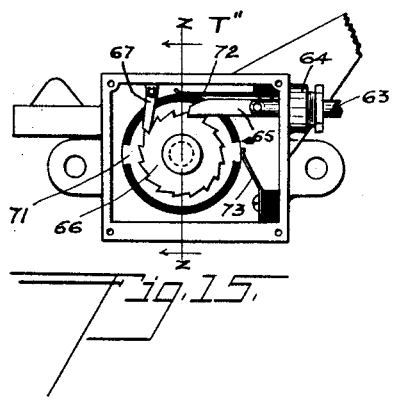
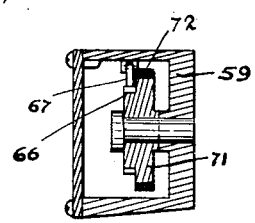
Grayson Moore, Inventor.
Witnesses:
Roy G. Kratz
Josephine Shaumer
By David O. Barnell,
Attorney.
COLUMBIA PLANOGRAPH CO., WASHINGTON, D. C.

UNITED STATES PATENT OFFICE.

GRAYSON MOORE, OF WESTON COUNTY, WYOMING.

WEIGHING AND RECORDING MECHANISM.

1,082,967.  Specification of Letters Patent. Patented Dec. 30, 1913.

Application filed August 8, 1910. Serial No. 576,221.

*To all whom it may concern:*

Be it known that I, GRAYSON MOORE, a citizen of the United States, and a resident of Weston county, in the State of Wyoming, have invented certain new and useful Improvements in Weighing and Recording Mechanism, of which the following is a specification.

My invention relates to weighing and recording mechanism, and it is the object thereof to provide electrically controlled means for automatically counterpoising beam-scales and for recording the weights indicated by the counterpoise.

My invention is especially applicable to large platform-scales such as are employed in weighing railway cars, and, when so employed, it enables the cars to be weighed while passing across the scale-platform.

Constructions embodying my invention are illustrated in the accompanying drawings, in which—

Figure 1 is a diagram showing the connections of the electrical controlling mechanism, Fig. 2 is a vertical sectional view through the counterpoise devices, Fig. 3 is a detail elevation of the beam-lock and releasing-magnet, Fig. 4 is a horizontal section through the counterpoise pendant and weight-supporting frame, Fig. 5 is a detail plan view of one of the releasable counterpoise-weights with the cover-plate removed therefrom, Figs. 6 and 7 are vertical sectional views through two of the releasable counterpoise-weights arranged in vertical juxtaposition to show the connections of the releasing devices, Fig. 8 is a vertical sectional view of the recording mechanism, Fig. 9 is a detail of the releasable detents for the recording-wheels, Fig. 10 is a transverse vertical section of the recording mechanism on the plane of the line $x$—$x$ of Fig. 8, Fig. 11 is a section through the register-wheels on the plane of the line $y$—$y$ of Fig. 8, Fig. 12 is a view of the scale-platform showing the relative location of the track-instruments, Fig. 13 is a side elevation of one of the track-instruments with the cover-plate removed therefrom, Fig. 14 is an end elevation of one of the track-instruments, Fig. 15 is a detail elevation of a part of one of the track-instruments with the cover-plate removed therefrom, and Fig. 16 is a transverse vertical section of the same on the plane of the line $z$—$z$ of Fig. 15.

In carrying out my invention I provide a tubular pendant 1 which is carried at the free end of the scale-beam 2 in place of the usual counterpoise-weight pendulum. A weight-supporting frame, consisting preferably of three vertically-extending rods 3 connected with a suitable base, not shown, and a series of spiders $4^a$, $4^b$ and $4^c$ arranged in vertically-spaced relation to each other, is arranged so that the hub-portions of the spiders are within the pendant 1 and the arms of the spiders extend through vertical slots in the sides of the pendant to connect with the frame-rods 3. Upon said spiders $4^a$, $4^b$ and $4^c$ within the pendant 1 are normally supported the counterpoise-weights which are arranged in a series of sets or piles A, B and C, which are supported by the respective spiders. The mass of the weights $a^1$, $a^2$, etc., of the first set or pile A are each made to represent the smallest unit of weight which it is desired to record, and of each succeeding set or pile the weights are each of such mass as to equal ten of the weights of the preceding set. Thus in the structure shown, if the smallest unit of weight which it was desired to record were 100 pounds, the weights $a^1$, $a^2$, etc., of the set A would be made of such mass as to counterpoise an actual weight of 100 pounds placed upon the scale-platform, the weights $b^1$, $b^2$, etc., of the set B would each counterpoise an actual weight of 1000 pounds placed on the scale-platform, and the weights $c^1$, $c^2$, etc., of the set C would each counterpoise a weight of 10,000 pounds on the scale-platform. The maximum capacity of the scale is, of course, the sum of all the weights of the several sets.

On each of the counterpoise-weights are flat radially-extending pins 5 which are so arranged that in each pile of the weights no two of the pins will be in vertical alinement with each other, there being preferably three of the pins on each weight, and the pins on the weights of each pile being arranged so as to lie in helical lines extending around the pile. On the inner side of the tubular pendant 1 are inwardly-extending pins 6 arranged in horizontally alined sets of three each and adapted to engage the pins 5 of the counterpoise-weights to lift said weights from the piles. When the parts are in the normal position shown in Fig. 2, a certain set of the pins 6 are just below but not in contact with the pins on the upper weight $c^1$ of the pile C, or that containing the weights of greatest mass. The vertical relation of the successive sets of lifting-pins are such that by upward movement of the pendant 1 through equal vertical distances one of the weights will be lifted for each unit of distance moved by the pendant, beginning with the weight $c^1$ and lifting successively the weights $c^2$, $c^3$, $c^4$, $c^5$, $c^6$, $c^7$, $c^8$, and $c^9$, of the set C, or the heaviest weights, then commencing with the next heaviest set of weights and lifting them from the pile B, beginning with the upper weight $b^1$ and lifting successively the weights $b^2$, $b^3$, $b^4$, $b^5$, $b^6$, $b^7$, $b^8$ and $b^9$, and then in like manner lifting successively the weights $a^1$, $a^2$, $a^3$, $a^4$, $a^5$, $a^6$, $a^7$, $a^8$ and $a^9$ of the set A, so that after the pendant has moved upwardly for a number of distance units equal to the number of weights all of the same will have been lifted and will be supported by the pendant. In practice, the distance through which the pendant moves between its engagement with any two successive weights may be very small so that the total distance moved by the scale-beam in lifting the entire series of weights need not cause the beam to vary appreciably from the horizontal.

Now it is evident that if the weight upon the scale-platform which is to be balanced by the counterpoise-weights is less than the maximum capacity of the scale, a counterpoise weight which cannot be lifted will be reached at some point in the upward movement of the beam. When the counterpoise weight is reached which cannot be lifted, the weight upon the scale-platform is shown to be greater than that represented by the sum of all of the counterpoise-weights lifted, and less than the amount represented by the sum of said weights plus that of the counterpoise-weight not lifted. To enable the determination of weight to be made within the limits of accuracy established by the smallest of the counterpoise-weights, or those of the pile A, I provide in connection with each of the other piles of weights releasing devices, which will be fully described hereinafter, and which operate when a weight which cannot be lifted is engaged by the lifting-pins 6 of the pendant, to withdraw the pins 5 of said weight, and of all of the remaining weights of the pile, to a position such that they are not engageable by the lifting-pins 6. The pendant is thus permitted to continue its upward movement unobstructedly until it reaches a position such that it will begin to lift the weights of the next pile, and upon the one of said weights which cannot be lifted, the releasing devices of said weight and of the remaining weights of the pile are operated to withdraw the pins 5 from the path of the lifting-pins 6. Thus, when the scale-beam has moved sufficiently to begin lifting the weights of the final set A, it will carry counterpoise weight in an amount such that with the addition of a certain number of the weights of the final set it will be brought to rest.

Each of the releasable counterpoise-weights, or those of the sets B and C, are provided with a central cylindrical opening in which is rotatably disposed a disk 7 of which the depth is made slightly less than that of the weight, so that the upper and lower surfaces of the disk lie inside of the corresponding surfaces of the weight. The disk 7 has an annular flange 8 around the central part thereof, fitting into a corresponding recess in the weight, and the upper surface of the flange lies flush with the bottom of a triangular recess formed in the main body of the weight beneath the removable cover-plate 9. Bars 10 are pivotally connected with the said flange 8 and extend tangentially outward therefrom through openings in the side of the weight so that the ends of said bars form the pins 5, before mentioned. Small springs 11 are arranged within the triangular recess, as shown in Fig. 5, and engage pins upon the flange 8 to normally hold the disk 7 in such position that the pins 5 protrude from the sides of the weight. By a slight rotation of the disk 7 the parts are moved to the positions shown by the dotted lines in said Fig. 5, at which the pins 5 are withdrawn into the body of the weight.

In the disk 7 are vertically-extending openings in which are disposed small spring-impressed pins 12 which extend below the lower surface of the disk far enough to enter the upper ends of the openings in the disk 7 of the next weight. On the upper surfaces of the weights are conical projections 13 and in the lower surfaces thereof are corresponding recesses which the projections enter when the weights are disposed in the piles, and thus hold the various weights in fixed relation to each other. The relation of the pins 12 and the openings therefor, and of the conical projections 13 and recesses, will be clearly apparent from Figs. 6 and 7. In the hubs of the spiders $4^b$ and $4^c$ which support the piles B and C of counterpoise-weights, are disks 14 which are revolubly held in the hubs and which have in the upper sides thereof openings adapted to receive the pins 12 of the lowermost weights of the piles. To the lower ends of said disks 14 are secured radial arms 15 from which the connecting rods 16 extend to and are connected with the longitudinally-movable cores $17^b$ and $17^c$ of the solenoid magnet-coils $18^b$ and $18^c$, said coils being supported on suitable brackets 19 secured to the spiders as shown in Fig. 4. On the arms of the spiders are conical projections 20, similar to those on the upper sides of the weights, and which are adapted to enter recesses formed in the lowermost weights of the piles, to insure said weights being always deposited upon the spiders in a certain definite relation thereto. By the connections made by the pins 12 between the disks 7 of a pile of the counterpoise weights, and between the lowermost weight of the pile and the disk 14 in the hub of the supporting spider, rotation of the disk 14 will turn all the disks 7 of the weights in the pile, and thus draw all of the pins 5 into the bodies of the weights.

From a suitable generator 21 a connection is made through the conductor 22 to the scale-beam 2. The scale-beam, pendant and counterpoise-weights being of conducting material, when the pins 6 of the pendant and the pins 5 of the weights are in contact, and the weights are resting in the piles, electrical connection is made from the conductor 22 to the weight-supporting spiders, which are insulated from the frame-rods 3, as indicated in Fig. 4. From the supporting-spider $4^a$ a connection is made through the coil $18^a$, conductor $23^a$ and register-magnet $24^a$ to the generator. A similar connection is made from the spider $4^b$ through the coil $18^b$, conductor $23^b$ and register-magnet $24^b$ to the generator, and from the spider $4^c$ through the coil $18^c$, conductor $23^c$ and register-magnet $24^c$ to the generator. When, during the upward movement of the pendant 1, the pins 6 engage the pins 5 of any of the weights the electrical circuit through the respective pile containing the weight is closed and, if the weight is lifted from the pile, said circuit is immediately broken by the separation of the weight from the weights remaining in the pile. The register-magnets $24^a$, $24^b$ and $24^c$ are made sufficiently sensitive to be operated by the interrupted current which passes through them when the counterpoise-weights of the respective piles with which they are connected are engaged by the lifting-pins 6 and lifted from the piles, but the coils $18^a$, $18^b$ and $18^c$ are so constructed that such momentary establishment of current through the same will not energize them sufficiently to cause movement of the cores thereof. Should a weight be engaged, however, which is not immediately lifted, the circuit through the respective coil would remain closed for a sufficient time to cause the actuation of the core. Movement of the cores $17^b$ and $17^c$, by turning the respective disks 14 with which they are connected, causes the disks 7 of all the weights in the piles to be turned to withdraw the pins 5 of the weights into the bodies thereof and thus remove said pins from the path of the lifting-pins 6. Each of the cores $17^a$, $17^b$ and $17^c$ of the solenoid coils carries a rod 26 of insulating material which when the core is moved by energization of the coil engages one of a pair of insulated contact-springs 25 and pushes the same into contact with the other spring. The contact of said springs 25 completes a shunt connection from the conductor 22 through a switch 27 and conductor 28 to the respective coil, so that when any of the coils are once energized a current is maintained through the same until the shunt connection is broken. The switch 27 is so arranged that the circuit through the same will be broken when the pendant 1 is in normal or lowered position, by the engagement with the switch of a pin 29 carried at the lower end of the pendant.

Referring now to the detailed structure of the recording instrument shown in Figs. 8 to 11, inclusive, a suitable casing 30 is provided, in the upper part of which a shaft 31 is fixedly mounted in lugs 32 on the casing. On said shaft between the lugs 32 are rotatably mounted the register-wheels $33^a$, $33^b$ and $33^c$, within each of which is arranged a spiral-coil spring 34 of which one end is attached to the shaft 31 and the other is connected with the wheel. The springs are so arranged that the tension thereof will normally hold the lugs 35 on the peripheries of the wheels in engagement with stop-lugs 36 formed on the casing. On the sides of the register-wheels are formed ratchet-teeth which are engaged by actuating-pawls $37^a$, $37^b$ and $37^c$ connecting with the armatures $38^a$ $38^b$ and $38^c$ of the magnets $24^a$, $24^b$ and $24^c$, respectively, and held in engagement with the ratchets by springs 39 so that when the magnets are energized the respective register-wheels will be advanced one space at each movement of the armature. Stop-pawls 40 are carried on a shaft 41 arranged near the register-wheels, the said pawls being rotatably mounted upon the shaft and each being normally held in engagement with the ratchet-teeth by a flat spring 42 of which one end is secured to the shaft 41 and the other engages a pin 43 on the side of the pawl. On the upper side of the casing 30 is pivotally mounted the platen-arm 44 which at the end thereof carries a suitable platen 45 adapted to engage and press a sheet of paper or the like upon the exposed faces of the register-wheels. The characters on the register-wheels are preferably formed by raised points adapted to emboss or indent the paper and thus make a permanent impression thereon without the use of ink. The platen-arm is normally held in raised position by a coil-spring 46, arranged as shown. The platen-arm is actuated by means of the electromagnet 47, through which a circuit is closed as hereinafter described, and of which the armature 48 is connected by a rod 49 with the platen-arm. On said connecting-rod 49 is carried a latch 50 which, during the upward stroke of the rod, engages and lifts the end of an arm 51 carried on the end of the stop-pawl shaft 41 and thus rotates said shaft. When the shaft is rotated the springs 42 engage the pins 52 on the sides of the stop-pawls 40 and turn said pawls out of engagement with the register-wheel ratchet-teeth. The said movement of the stop-pawls engages the same with the fingers 53 extending up from the actuating-pawls 37ᵃ, 37ᵇ and 37ᶜ and thus moves said pawls out of engagement with the ratchet-teeth as indicated by the dotted lines in Fig. 8. The latch 50 and arm 51 are so arranged that as the connecting-rod 49 reaches the upward limit of its movement the end of the arm slips off the latch and drops to its normal position, thus permitting the register-wheel pawls to reëngage therewith. By means of the foregoing mechanism, after each movement of the platen to record the positions of the wheels, the wheels are released by the disengagement of the stop-pawls and actuating-pawls therefrom so that the springs 34 are permitted to return the wheels to their normal positions, with the stop-lugs 35 engaging the lugs 36 on the casing.

To prevent movement of the scale-beam until the full load has been placed on the scale-platform, I provide a locking device comprising an electromagnet 54 of which the armature 55 controls a latch 56 adapted to enter a notch 57 formed in the side of the beam, as shown in Figs. 2 and 3, and prevent upward movement of the beam. When the magnet 54 is energized the latch is withdrawn from the notch and the beam is permitted to raise. To prevent too rapid upward movement of the beam when released, I provide a damping- or checking-device comprising a disk or plate 85 suspended from the beam by a slender rod 86 within a cylinder 87 filled with a liquid which, when the beam is moved, must pass around the edges of the plate 85 between the same and the walls of the cylinder.

When the scale is to be used for weighing railway cars, I prefer to employ automatic devices for controlling the action of the beam-releasing magnet 54 and of the platen-actuating magnet 47, as follows: At the side of one of the track-rails 88 upon the scale-platform 58, and at a distance from the entrance end of the platform slightly greater than the distance between the front and rear wheels of a car-truck, is placed a track-instrument T' which controls the circuit through the beam-releasing magnet 54. Near the exit end of the scale-platform is placed a similar track-instrument T'' which controls the circuit through the platen-actuating magnet 47. Each of said instruments comprises a suitable casing 59 which is secured to the web of the rail 88, resting upon the lower flange thereof, and to which at the upper side is pivotally connected the lever 60. Said lever 60 extends up past the side of the rail into a position such as to be engageable by the wheels of a car passing along the track, and is normally held in raised position by means of a coil-spring 61 disposed under one end thereof. At the pivoted end of the lever is a depending forked arm 62 with which is connected the end of a rod 63 which extends through a stuffing-box 64 into the casing 59. Said rod 63 has connected with the inner end thereof a pawl 65 adapted to engage and actuate a ratchet-wheel 66 rotatably mounted in the casing, a stop-pawl 67 also engaging the ratchet-wheel to prevent backward movement thereof. The number of teeth in the ratchet-wheel is preferably a multiple of eight, there being sixteen teeth in the wheel shown. In the track-instrument T' a disk 68 is connected with the ratchet-wheel 66, and an insulated brush-spring 69 is arranged to engage the periphery of the disk. Portions of the periphery of the disk 68 are formed of insulating material so arranged that electrical contact between the brush-spring and disk will be made only at positions corresponding to each fourth tooth of the ratchet. The disk 68 and brush-spring 69 are connected in a circuit made from the generator 21 through the conductor 22, the beam-releasing magnet 54, and the conductor 70, so that when contact is made between the disk and brush-spring the magnet 54 will be energized and release the scale-beam, as described. The initial position of the disk 68 is so arranged that the third wheel of each car passing onto the scale-platform and engaging the lever of the track-instrument T' will cause the closing of said circuit, while the fourth wheel of the car will actuate the disk to again open the circuit.

In the track-instrument T'' a disk 71 is connected with the ratchet-wheel 66, and two insulated brush-springs 72 and 73 are arranged to engage the periphery of the disk. Portions of the periphery of the disk are formed of insulating material so arranged that the disk will be in electrical contact with the brush-springs alternately at positions corresponding to each fourth tooth of the ratchet. From the brush-springs 72 and 73 conductors 74 and 75 extend respectively to the insulated brush-springs 76 and 77, which are arranged to bear upon the periphery of a disk 78 which is revolubly mounted in the casing of the recording instrument. The disk 78 is actuated by means of a pawl 79 adapted to engage ratchet-teeth formed on the side of the disk, said pawl being connected with an arm 80 depending from the platen-arm 44, and a stop-pawl 81 being arranged to prevent rearward movement of the disk. Portions of the periphery of the disk are formed of insulating material so arranged that the disk will be in electrical contact with the brush-springs 76 and 77 alternately at each movement of the disk. From the disk a conductor 82 extends to the platen-actuating magnet 47 and thence to the generator 21, and the disk 71 of the track-instrument T'' is connected with the generator through the conductors 83 and 22. The disks 71 and 78 are so arranged that the first wheel of each car engaging the lever of the track-instrument T'' just before passing off the scale-platform will turn the disk 71 to a position at which it will be in electrical connection with the disk 78 through one set of the brush-springs 72 and 73, conductors 74 and 75, and brush-springs 76 and 77, and thus will close the circuit through the platen-actuating magnet 47. The movement of the platen-arm thus caused, advances the disk 78 so that the connection thereof with the brushes 76 and 77 is reversed, the circuit through the magnet 47 being thus immediately broken and the platen-arm released. The three remaining wheels of the car must then pass over the track-instrument T'' and the first wheel of the next car engage said track-instrument before the circuit through the magnet 47 will be again closed, and said circuit when closed will be established through the brush-springs and the one of the conductors 74 and 75 not used at the preceding operation.

The general operation of the mechanism may be best understood by following out the detailed operation of the various parts thereof in weighing a car and recording its weight, the mechanism being assumed to be in normal position at the beginning and to be restored to normal position again at the ending of the operation. When in normal position the scale-beam is held by the latch 56, and the counterpoise mechanism is all in the position shown in Fig. 2, while the recording devices are in the position shown in Fig. 8. When a car passes onto the scale-platform and the wheels thereof have reached the position shown in full lines in Fig. 12, so that the entire weight of the car is on the platform, the wheels of the first truck of the car in passing over the track-instrument T' will have actuated the contact-disk 68 of said instrument to the position shown in Fig. 13. As the first wheel of the rearward truck of the car passes over the instrument T' the disk 68 is advanced one space so that the electrical circuit through the beam-releasing magnet 54 is closed, and the latch 56 thereby withdrawn from engagement with the scale-beam 2. When the scale-beam is released it immediately begins upward movement and the lifting-pins 6 of the pendant engage the pins 5 of the weight $c^1$. Assuming that each of the weights in the piles A, B and C represent respectively, 100 pounds, 1000 pounds, and 10000 pounds, and that the weight of the car upon the platform is between 23400 and 23500 pounds, the weights $c^1$ and $c^2$ would be at once lifted from the top of the pile C, and as each of said weights was engaged by the lifting-pins 6 the electrical circuit through the releasing-magnet $18^c$ and the register-magnet $24^c$ would be closed momentarily and immediately opened again as the weight was lifted and disengaged from the pile. Each of the two current-impulses thus caused in the circuit would actuate the armature of the magnet $24^c$ and thereby advance the register-wheel $33^c$ two spaces, but such current impulses being of only momentary duration would not sufficiently energize the sluggish solenoid magnet $18^c$ to cause movement of the core thereof. When the pins 6 engage the weight $c^3$, however, the weight of the car being insufficient to cause said weight to be lifted, the circuit through the magnet $18^c$ would be maintained for a sufficient time to energize the same and cause a movement of its core. Such movement of the core $17^c$ would cause the closing of the shunt circuit through the contact-springs 25, so that the current through the magnet would be continued until broken by the opening of the switch 27. The movement of the core would also rotate the disk 14 in the spider $4^c$ and the disks 7 in the weights $c^3$ to $c^9$, inclusive, which had not been lifted from the pile. The rotation of the disks 7 by withdrawing the pins 5 of said weights into the bodies thereof would permit the pendant to move upward unobstructedly until the weight $b^1$ was engaged. The weight $b^1$ and the weights $b^2$ and $b^3$ would be lifted, and the register-wheel $33^b$ actuated in the same manner as the register-wheel $33^c$ when the weights $c^1$ and $c^2$ were engaged and lifted from the pile C. Upon engaging the weight $b^4$ the releasing-magnet $18^b$ would be energized and the pins 5 of the weights $b^4$ to $b^9$, inclusive, withdrawn into the bodies of the weights, whereupon the upward movement of the pendant would be continued until the weights $a^1$, $a^2$, $a^3$, and $a^4$ had been lifted from the pile A and the weight $a^5$ engaged by the pins 6, when the upward movement of the pendant would cease and the counterpoise devices all stand in the positions indicated in Fig. 1. The engagement of the pins 6 with the weights in the pile A would, of course, cause corresponding movements to be made of the register-wheel $33^a$, and the engagement of the pins 6 with the weight $a^5$, being maintained for a sufficient time to energize the solenoid coil $18^a$, would actuate the core $17^a$ and cause the same to close the shunt circuit made through the contact-springs 25 and the coil. It will be observed that as each of the register-magnets receives one more impulse than the number of weights lifted from the pile connected therewith, it is necessary that the register-wheels be so constructed that the indication thereof at the first movement will be zero.

Returning now to the scale-platform, as the last wheel of the car passes over the track-instrument T' the disk 68 of said instrument will be turned to the position indicated in Fig. 1 so that the circuit through the releasing-magnet 54 will be broken, and the latch 56 enabled to engage and lock the beam when it is returned to its normal position. Just before the front wheel of the car passes off the scale-platform it engages the lever of the track-instrument T'' and causes the disk 71 of said instrument to be moved to a position such as shown in Figs. 1 and 15, thus closing a circuit through the platen-actuating magnet 47 and causing the actuation of the platen-arm to record the indication of the register-wheels. The downward movement of the platen-arm actuates the disk 78 to break the circuit through the magnet 47, so that the platen is immediately released. The upward movement of the platen-arm connecting-rod 49 engages the latch 50 with the arm 51 of the stop-pawl-shaft 41 and causes the stop- and actuating-pawls to be disengaged from the register-wheels so that the same are immediately restored to normal position by the springs 34. As the car passes off the scale-platform the scale-beam is pulled downward by the counterpoise-weights until the same are all restored to their normal positions upon the respective piles, and as the pendant reaches the end of its downward movement the pin 29 engages the switch 27 and opens the shunt-circuit through the coils 18$^a$, 18$^b$ and 18$^c$ so that the cores thereof are released and permitted to return to their normal positions. The disks 7 of the weights in the piles B and C are thus released so that the pins 5 are again permitted to extend from the bodies of the weights. During the downward movement of the pendant the engagement of the various weights with the piles and the disengagement of the pins 6 from the weights as the same are deposited upon the piles, does not affect the register-magnets 24$^a$, 24$^b$ and 24$^c$, since the circuits through said magnets remain closed through the contact-springs 25 until broken by the opening of the switch 27 when the pendant has reached its normal position. The maintaining of the circuit through the magnet 24$^a$ during the downward movement of the pendant is the only function of the coil 18$^a$, it not being necessary that said magnet operate releasing devices for the counterpoise-weights, as do the magnets 18$^b$ and 18$^c$. It will be noted that the scale-beam will always come to rest at some part of that portion of its upward movement during which the series of weights in the pile A is being lifted, and that, by arranging the parts so that the beam is exactly horizontal when the middle weight of said pile is engaged, the beam will never come to rest at a position varying from the horizontal more than half the distance which it moves in lifting the weights of said pile. As the total distance moved by the beam in lifting said weights is very small, the variation of the beam from the horizontal at the time the weight is recorded need never be such as to appreciably affect the accuracy of the indication.

It will be obvious that the counterpoising operations as automatically controlled by the electrical controlling mechanism may take place with such rapidity that the weight of a car may be measured and recorded while the wheels thereof are moving across the scale-platform from the approximate position shown in full lines to that shown in dotted lines in Fig. 12.

Now, having described my invention, what I claim and desire to secure by Letters Patent is:

1. The combination with a scale-beam, of a plurality of counterpoise-weights arranged in a series of piles, means carried by the scale-beam and adapted to serially engage the weights to lift the same from the piles, the weights having movable parts engageable by the lifting means and means for actuating said parts to release the weights from said lifting means.

2. The combination with a scale-beam, of a plurality of counterpoise-weights arranged in a pile, means carried by the beam and adapted to serially engage and lift the weights, an electrical circuit made through the pile of weights, current-generating means in said circuit, and a number registering device controlled by said circuit.

3. The combination with a scale-beam and a series of counterpoise-weights, of connecting means by which movement of the scale-beam will cause the weights to be serially engaged and lifted thereby, an electrical circuit made through the weights and arranged so as to be closed and opened by movement of the weights, and indicating means controlled by said electrical circuit and adapted to indicate the number of weights engaged by the connecting means.

4. The combination with a scale-beam and a series of counterpoise weights, of connecting means by which movement of the scale-beam may cause the weights to be serially engaged and lifted thereby, means for indicating numbers, electrical actuating means therefor, and an electrical circuit connected with said actuating means and controlled by movements of the weights.

5. The combination with a scale-beam and a series of counterpoise weights, of connecting means by which movement of the scale-beam may cause the weights to be serially engaged and lifted thereby, electrically actuated number-indicating means, and an electrical circuit made through the weights and controlling the number-indicating means.

6. The combination with a scale-beam, of a series of counterpoise-weights arranged in sets, each of the weights of a set being of the same mass and the weights of the different sets being of different masses, connecting means by which movement of the scale-beam may cause all of the weights to be serially engaged and lifted thereby beginning with the weights of greatest mass and ending with the weights of least mass, and means for releasing in any set of the weights all of the weights which have not been lifted whenever any of the same are engaged and not immediately lifted by the connecting means.

7. The combination with a scale-beam, of a series of counterpoise-weights arranged in sets, each of the weights of a set being of the same mass and the weights of the different sets being of different masses, connecting means by which movement of the scale-beam may cause all of the weights to be serially engaged and lifted thereby beginning with the weights of greatest mass and ending with those of least mass, means for releasing in any set of the weights all of the weights which have not been lifted whenever any of the same are engaged and not immediately lifted by the connecting means, and means in connection with each set of the weights for indicating the number of weights lifted from the set.

8. The combination with a scale-beam, of a series of counterpoise-weights arranged in sets, connecting means by which movement of the scale-beam will cause the weights to be serially engaged and lifted thereby, indicating devices electrically connected with each set of the weights and adapted to register the number of weights lifted in the respective sets, and electrically-controlled means for releasing the unlifted weights of a set when one of the same is engaged and not immediately lifted by the connecting means.

9. In a weighing and recording mechanism, in combination, a scale-beam, a series of counterpoise-weights arranged in piles, the weights of each pile being of like mass and the weights of different piles being of unlike mass, a device carried by the scale-beam and adapted to serially engage and lift the weights from the piles during a certain upward movement of the scale-beam, beginning with the weights of greatest mass and ending with those of least mass, a register-magnet for each pile of weights, electrical connecting means between the respective magnets and piles of weights and between the lifting means and magnets whereby engagement of the lifting device with any of the weights will close a circuit through the register-magnet connected with the respective pile of weights, and slow-acting electrically-controlled means adapted to release the weights of a pile from the lifting device when the same has been in contact with one of the weights of the pile for a certain time greater than the time required to operate the register-magnet.

10. The combination with a scale-beam, of a series of counterpoise-weights arranged in a pile, a device carried by the scale-beam and adapted to serially engage and lift the weights during a certain upward movement of the scale-beam, a register-magnet, means electrically connecting the same with the pile of weights, means electrically connecting the register-magnet with the lifting device so that engagement thereof with any of the weights in the pile will close a circuit through the register-magnet and the lifting of the weight from the pile open said circuit, a magnet arranged in the circuit and operatable only when the circuit remains closed for a time greater than that required to operate the register-magnet, a circuit-closing device actuated by the latter magnet, a shunt-circuit through said magnet and the register-magnet, and controlled by said circuit closing device, and means controlled by the lifting device for opening said shunt-circuit.

11. The combination with a scale counterpoise mechanism comprising a scale-beam, a series of counterpoise-weights, and a device carried by the scale-beam and adapted to serially engage and lift the weights during a certain upward movement of the scale-beam; of a register-wheel, an electromagnet for actuating said wheel, and means connecting the electromagnet with the lifting device and the weights to form an electrical circuit through the same.

12. The combination with a scale of counterpoise mechanism comprising a scale-beam, a series of counterpoise-weights, and a device carried by the scale-beam and adapted to serially engage and lift the weights during a certain upward movement of the scale-beam; of a register-wheel, an electromagnet for actuating said wheel, means connecting the electromagnet with the lifting device and weights to form an electrical circuit through the same, a detent for holding the register-wheel at positions to which it is turned by the actuating electromagnet, means tending to return the wheel to normal position, means for recording the position of the register-wheel, and means controlled by said recording means for releasing the detent.

13. The combination with a scale-beam, of a member connected to and movable with the scale-beam, a series of weights positioned in the path of said member so as to be serially engaged and lifted during upward movement thereof, actuating means connected with the weights for displacing the same from the path of said member, and means for operating said actuating means when a weight is engaged but is not lifted for a predetermined time after its engagement.

14. The combination with a railway platform-scale, of a series of counterpoise-weights, means carried by the scale-beam and adapted to serially engage and lift the weights during a certain movement of the scale-beam, register-wheels, electrically-controlled actuating means therefor, means electrically connecting said actuating means with the weights so that the operation thereof is controlled by the weights, a platen adapted to coöperate with the register-wheels to record the indication thereof, electrically-controlled means for actuating the platen, and a circuit-closing device electrically connected with the platen-actuating means and arranged so as to be operated by a car passing over the scale-platform.

15. The combination with a railway platform-scale, of means for automatically counterpoising the scale-beam, register devices for automatically indicating the amount of counterpoise, a detent arranged to hold the scale-beam, electrically-controlled means for releasing said detent, a circuit-closing device electrically connected with the releasing means and arranged so as to be operated by a car passing onto the scale-platform, means adapted to coöperate with the register devices to record the indication thereof, electrically-controlled actuating means for said recording means, and a circuit-closing device electrically connected with said actuating means and arranged so as to be operated by a car passing over the scale-platform.

16. In a scale mechanism, a vertically movable part, a series of weights, means adapting the movable part to serially engage and lift the weights, an electrical circuit controlled by movements of the weights, two electromagnets included in said electrical circuit, one of said electromagnets being relatively sluggish, number-indicating means actuated by one of said electromagnets, and means actuated by the sluggish magnet for releasing weights from the movable part.

17. In a scale mechanism, a vertically movable member, a series of weights having retractable portions, the vertically movable member having parts adapted to serially engage the retractable portions of and to lift the respective weights, an electrical circuit made through the weights, and means controlled by said circuit for actuating the retractable portions of the weights to remove the same from the path of the vertical member.

18. In a scale mechanism, a plurality of sets of weights, means for serially lifting the several weights beginning with the weights of one set and continuing throughout the several sets, a number-indicating device for each set of the weights, electrical actuating means for each indicating device, and electrical circuits connecting the several actuating devices with the respective sets of weights and controlled by movements of the weights of the respective sets.

19. In a scale mechanism, the combination with a series of counterpoise weights, and automatic means for balancing a load with said weights, of a number-indicating device, electrical actuating means therefor, and a circuit controlling the actuating means and connected through the weights and controlled thereby.

20. In a scale mechanism, the combination with a series of counterpoise weights, and automatic means for balancing a load with said weights, of a number-indicating wheel, an electromagnet for actuating the same, and a circuit including said electromagnet and connected with the weights, whereby the number of weights used may be indicated by the wheel.

21. In a scale mechanism, a plurality of sets of weights, each set comprising a plurality of weights of like mass and the weights of the different sets being of unlike mass, means for automatically disposing certain of the weights to balance a load, a number-indicating wheel for each set of weights, an electromagnet for actuating each wheel, and electrical circuits connecting the respective sets of weights and electromagnets, whereby the number of weights used by each set may be indicated by the respective wheels.

In testimony whereof I have hereunto subscribed my name in the presence of two witnesses.

GRAYSON MOORE.

Witnesses:
 ROY G. KRATZ,
 D. O. BARNELL.

---

Copies of this patent may be obtained for five cents each, by addressing the "Commissioner of Patents, Washington, D. C."